(12) United States Patent
Storck (10) Patent No.: US 11,971,808 B2
(45) Date of Patent: Apr. 30, 2024

(54) GENERATION OF TEST MODELS FROM BEHAVIOR DRIVEN DEVELOPMENT SCENARIOS BASED ON BEHAVIOR DRIVEN DEVELOPMENT STEP DEFINITIONS AND SIMILARITY ANALYSIS USING NEURO LINGUISTIC PROGRAMMING AND MACHINE LEARNING MECHANISMS

(71) Applicant: Siemens Aktiengesellschaft, Munich (DE)

(72) Inventor: Stephan Storck, Bad Feilnbach Au (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 137 days.

(21) Appl. No.: 17/426,704

(22) PCT Filed: Nov. 28, 2019

(86) PCT No.: PCT/EP2019/082923
§ 371 (c)(1),
(2) Date: Jul. 29, 2021

(87) PCT Pub. No.: WO2020/160810
PCT Pub. Date: Aug. 13, 2020

(65) Prior Publication Data
US 2022/0100643 A1 Mar. 31, 2022

(30) Foreign Application Priority Data
Feb. 5, 2019 (EP) .................................. 19155524

(51) Int. Cl.
*G06F 11/36* (2006.01)
(52) U.S. Cl.
CPC ................ *G06F 11/3684* (2013.01)

(58) Field of Classification Search
CPC ............................................. G06F 11/36–3696
See application file for complete search history.

(56) References Cited

U.S. PATENT DOCUMENTS

| 6,415,396 B1* | 7/2002 | Singh ................. G06F 11/3688 714/33 |
| 10,073,763 B1 | 9/2018 | Raman et al. |

(Continued)

OTHER PUBLICATIONS

Kamalakar, S., Automatically Generating Tests from Natural Language Descriptions of Software Behavior, Virginia Tech [online], 2013 [retrieved Mar. 15, 2023], Retrieved from Internet: <URL: https://vtechworks.lib.vt.edu/server/api/core/bitstreams/71dea6b3-dd7e-44f5-95f6-6be1077770dc/content>, whole document.*

(Continued)

*Primary Examiner* — Todd Aguilera
(74) *Attorney, Agent, or Firm* — Schmeiser, Olsen & Watts LLP (57) ABSTRACT

Provided is a method for automated verification of a software program in a Behavior-Driven Development environment and a data processing system configured to execute such a method. Individual test steps of BDD test scenarios are first matched and then assigned to existing test step definitions from a BDD framework. If a one-to-one matching is not possible, natural language processing is used to decide if an assignment is possible with a certain matching probability. The assigned test step definitions are used to generate graphical test models for the test scenarios, e.g., UML diagrams. Finally, executable test scripts are generated to test the software program. The present invention relates particularly to Behavior-Driven Development and combines traditional BDD advantages with Model Based Testing for improved convenience and automatization in case of complex software packages.

17 Claims, 3 Drawing Sheets

(56) References Cited

U.S. PATENT DOCUMENTS

| | | | |
|---|---|---|---|
| 2016/0321169 A1* | 11/2016 | Chacko | G06F 11/3684 |
| 2018/0011780 A1 | 1/2018 | Aggarwal et al. | |
| 2018/0267887 A1 | 9/2018 | Dsouza | |
| 2018/0294048 A1* | 10/2018 | Blumenthal | G16H 10/60 |
| 2018/0322036 A1 | 11/2018 | Alam et al. | |
| 2019/0027134 A1* | 1/2019 | Kakirwar | G10L 15/063 |

OTHER PUBLICATIONS

Brandes et al., Three methods, one goal: test automation with BDD, MBT and KDT in comparison, 35(3), 2015.
Soeken Mathias et al: "Assisted Behavior Driven Development Using Natural Language Processing", Objects, Models, Components, Patterns, Springer Berlin, Heidelberg, pp. 269-287, XP047004825, ISBN: 978-3-642-30560-3, abstract, fig. 7, sections 3.-4.; 2012.
Brandes et al., "Drei Methoden, ein Ziel: Testautomatisierung mit BDD, MBT und KDT im Vergleich," Softwaretechnik-Trends, 35(3), 2015; 2015.
PCT International Search Report and Written Opinion of International Searching Authority dated May 12, 2020 corresponding to PCT International Application No. PCT/EP2019/082923 filed Nov. 28, 2019.

* cited by examiner

GENERATION OF TEST MODELS FROM BEHAVIOR DRIVEN DEVELOPMENT SCENARIOS BASED ON BEHAVIOR DRIVEN DEVELOPMENT STEP DEFINITIONS AND SIMILARITY ANALYSIS USING NEURO LINGUISTIC PROGRAMMING AND MACHINE LEARNING MECHANISMS

CROSS-REFERENCE TO RELATED APPLICATIONS

This application claims priority to PCT Application No. PCT/EP2019/082923, having a filing date of Nov. 28, 2019, which is based on EP Application No. 19155524.2, having a filing date of Feb. 5, 2019, the entire contents both of which are hereby incorporated by reference.

FIELD OF TECHNOLOGY

The following pertains to a computer-implemented method for automated verification of a software program in a behavior-driven development environment. The following further pertains to a device comprising a processor configured to perform such a method. The following particularly pertains to Behavior Driven Development (BDD).

BACKGROUND

In recent years, BDD has emerged as an agile software development approach for the specification and execution of automated acceptance tests of software programs. BDD was introduced by Dan North in 2006 to simplify Test-Driven Development (TDD), see for example Brandes et al., "Drei Methoden, ein Ziel: Testautomatisierung mit BDD, MBT and KDT im Vergleich," Softwaretechnik-Trends, 35(3), 2015. TDD is a software development methodology which essentially states that for each unit of software, a software developer must define specific test sets for the unit first, then implement the unit and finally verify that the implementation of the unit makes the tests succeed. BDD combines Test-Driven Development (TDD), Object-Oriented Analysis (OOA), Object-Oriented Design (OOD) and Domain-Driven Design (DDD) to provide a unified language and approach for handling such a software development process from requirements analysis to implementation.

BDD is largely facilitated through the use of a simple domain-specific language (DSL) using natural language constructs (e.g., English-like sentences) that can express the behavior and the expected outcomes of the software. This 'ubiquitous language' can be understood and jointly used by quality managers, domain experts, software developers and customers. BDD employs a semi-formal format for behavioral specification of the software, which is borrowed from user story specifications from the field of object-oriented analysis and design.

To this end, each software unit is decomposed into so-called scenarios, each scenario testing one individual aspect of the software. Each scenario is in turn divided into test steps, which describe a desired outcome of the respective aspect of the software starting from given initial conditions and running through predefined events. Each scenario with its test steps is formulated as a natural language script, which can later be translated into executable test scripts in an automated way. The executable test scripts can then be executed as automated tests for testing the software for its correct implementation. The software requirements within the test scripts are usually written in "given-when-then" sentences based on the ubiquitous language of domain-driven design. This is intended to facilitate the transition between the language used to define the domain-driven requirements and the programming language used to implement them.

One test automation framework widely used for automated acceptance tests written in BDD style is called Cucumber, which comprises a plain language parser called Gherkin. The desired behavior of the software is formulated within Gherkin in a declarative way:

GIVEN (precondition/initial conditions) . . .
WHEN (event/action/trigger) . . .
THEN (effect to be observed/system response) . . . .

Such descriptive languages are semi-formal with the capital words (GIVEN, WHEN, THEN) serving as pre-designated keywords. Due to the simple grammar and the natural language keywords, the BDD requirements can be understood and manually executed by technical testers. Cucumber runs through these keywords and processes them step by step, thereby mapping every non-capital phrase following these keywords to a parameterized function call. Traditionally, Ruby scripts were used for this purpose within Cucumber, which replace the test steps by automated program calls and thus make the BDD description automatically executable. However, Cucumber now supports a variety of different programming languages through various implementations, including Java and C#.

BDD is easy to understand and straightforward to implemented. However, in large and complex use cases, the approach with its textual and manually created scenarios may lack the manageability to handle a large number of scenarios and complex tests sets while ensuring completeness and consistency. For the development of complex systems, approaches like Model Based Testing (MBT) or Keyword Based Testing (KBT) are often seen as more appropriate. In particular, MBT approaches allow reviewing and verifying the completeness and consistency of even complex test scenarios using a visual representation of the scenarios, e.g., using diagrams in Unified Modelling Language (UML). However, MBT has to be individually embedded into the existing development and test process for each software component.

SUMMARY

An aspect relates to improved convenience and automatization for the verification of complex software packages.

According to an aspect of embodiments of the invention, a computer-implemented method for automated verification of a software program in a behavior-driven development environment comprises receiving, with a data processing system, test scenarios, each test scenario defining an expected behavior of the software program in consecutive test steps, which are formulated in a domain-specific language using natural language phrases and which describe a desired outcome of the software program for predefined events based on given initial conditions; importing test step definitions from the behavior-driven development environment; determining for each test step of the test scenarios if the test step matches with one of the test step definitions on basis of the natural language phrases of the test step; assigning all matched test steps to the corresponding test step definitions; applying natural language processing, NLP, on the natural language phrases of any test steps remaining unmatched, wherein the NLP provides a confidence level for each unmatched test step to correspond to one of the test step definitions; assigning any unmatched test step to the corresponding test step definition when the confidence level surpasses a first predefined matching probability; and at least one of: generating graphical test models for the test scenarios on basis of the assigned test step definitions; and generating executable test scripts for the test scenarios on basis of the assigned test step definitions.

According to another aspect of embodiments of the invention, a data processing system comprises a processor configured to perform a method according to embodiments of the invention.

According to yet another aspect of embodiments of the invention, a computer program product (non-transitory computer readable storage medium having instructions, which when executed by a processor, perform actions) comprises executable program instructions configured to, when executed, perform the method according to embodiments of the invention.

According to yet another aspect of embodiments of the invention, a non-transient computer-readable data storage medium comprises executable program instructions configured to, when executed, perform the method according to embodiments of the invention.

The non-transient computer-readable data storage medium may comprise, or consist of, any type of computer memory, in particular semiconductor memory such as a solid-state memory. The data storage medium may also comprise, or consist of, a CD, a DVD, a Blu-Ray-Disc, an USB memory stick, a memory card (e.g., an SD card) or the like.

According to yet another aspect, embodiments of the invention provides a data stream representing, or configured to generate, executable program instructions configured to, when executed, perform the method according to embodiments of the invention.

One idea of embodiments of the present invention is to provide the means to utilize the benefits of BDD with its easy to use and natural language based scenarios while maintaining the required manageability for large, complex development projects. To this end, the proposed solution automatically assigns the test steps of each scenario with already existing test step definitions of a test automation framework (from the integrated BDD development environment). If a literal and/or unambiguous matching is not possible, e.g., because the respective scenario was written in a different style and/or uses different wording, then the NLP algorithm is used to find a best match of the respective test step among the existing test step definitions. If the probability of this best match is high enough to provide a correct/likely fit between test step and test step definition, e.g., if it has a matching probability of at least 80% or 90% or more, then the test step is assigned to the respective test step definition.

The present approach allows an efficient mapping of BDD step phrases to a test automation framework of the integrated BDD development environment and supports the structured development of the necessary framework code. Furthermore, it facilitates the automated generation and synchronization of a graphical test model from BDD scenarios so that the advantages both from BDD and MBT methods may be utilized even for large and complex development projects. The graphical test models may be used to visualize, review and modify test cases so that the consistency and completeness of the BDD scenarios can be ensured. For example, missing scenarios may be identified based on a test model review. As another example, similar scenarios may be combined into a single scenario. Furthermore, the ability to use MBT techniques adds an additional abstraction level and supports the change management. The executable test scripts may be automatically generated directly based on the assigned test step definitions and/or after a verification of the scenario(s) on basis of the generated test model.

Advantageous embodiments and improvements of the present invention are found in the subordinate claims.

According to an embodiment, the method further may comprise updating, when the confidence level is above the first predefined matching probability, the respective test step definition on basis of the natural word phrases of the respective test step. Hence, the existing phrase pattern definitions from the BDD test automation framework may be adapted to include alternative and/or modified test step definitions corresponding to the matched test steps. The first predefined matching probability may be set to a high confidence value of 80% or more so that there is a high probability for a match between the test step and the test step definition.

According to an embodiment, the method may further comprise adding, when the confidence level is below a second predefined matching probability, a test step definition to the behavior-driven development environment corresponding to the respective test step. Hence, in case that the confidence level is lower than this reference probability, which may be for example 50% or similar, it is decided that the test step does not match to any existing test step definition. Instead, the test step is used to define a new test step definition, which is then added to the BDD test automation framework and may be used further.

According to an embodiment, a user verification may be requested if the confidence level is below the first predefined matching probability but above a second predefined matching probability. For example, the first predefined matching probability may be set to 80% or 90% and the second predefined matching probability may be set to 50%. If the confidence level is above the first predefined matching probability, then the test step is considered to match the respective test step definition, which may then be updated based on the formulation of the test step. If the confidence level is below the second predefined matching probability, then the test step does not match any of the existing definitions and hence may be used to define a new one. However, in the intermediate range between 50% and 80% (or 90%), the situation may be unclear, i.e. the test step may or may not match one of the existing definitions. In that case a user input may be required to settle the further procedure, that is if a new definition is introduced, if an existing definition is updated or if the scenario is discarded, etc.

According to an embodiment, the method may further comprise feeding the user verification to a machine learning algorithm of the NLP. For example, commonality criteria of the NLP may be adjusted based on the verification results, e.g., reduce the relevance of certain phrases, identify invalid commonalities and/or commonalities not yet identified. Then, the commonality detection accuracy may be compared in future executions to check whether the optimized criteria did improve the accuracy of the NLP. In the long run, this may reduce the effort for manual validation and improve the accuracy of the commonality detection over time. After the required training and optimization of the NLP engine, the algorithm of embodiments of the invention may detect and match phrases in a fully unattended and automated way.

According to an embodiment, generating the graphical test models may comprise combining similar test scenarios on basis of test steps assigned to the same test step definition.

According to an embodiment, generating the graphical test models may comprise identifying test data within the test scenarios based on the natural language phrases.

According to an embodiment, the graphical test models may comprise unified modeling language diagrams, i.e. UML diagrams.

According to an embodiment, the method may further comprise comparing the graphical test models with the test scenarios to determine if the graphical test models are in compliance with the expected behavior of the software program. Hence, based on the generated graphical test model, missing and/or incorrect scenarios may be identified.

Embodiments of the invention will be explained in greater detail with reference to exemplary embodiments depicted in the drawings as appended.

BRIEF DESCRIPTION

Some of the embodiments will be described in detail, with references to the following Figures, wherein like designations denote like members, wherein.

DETAILED DESCRIPTION

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
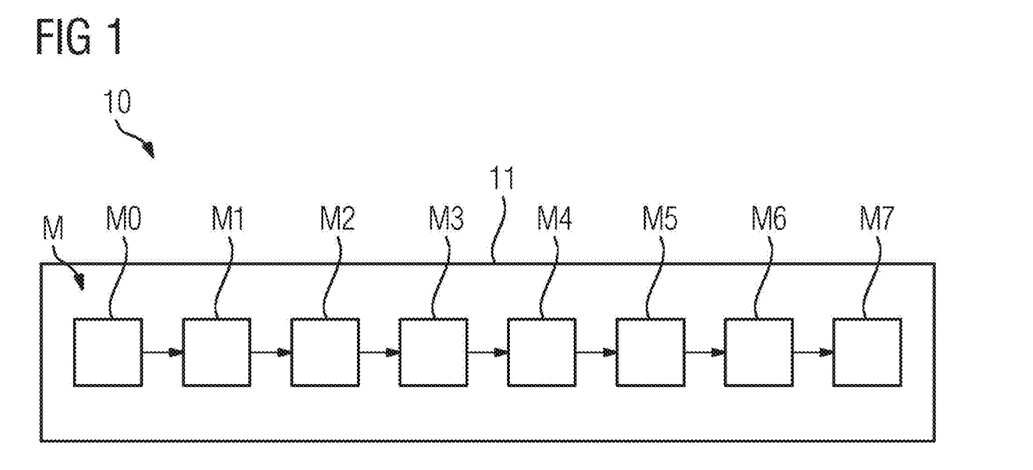
FIG. 1 shows a device with a processor performing a method according to an embodiment of the invention.

FIG. 1 shows a data processing system 10 with a processor 11 performing a method M according to an embodiment of the invention. Certain aspects of the method M are exemplified in FIGS. 2 and 3.

Besides the processor 11, the data processing system 10 may include the usual components like an accessible memory, a storage unit, an input unit, an output unit and so on (not shown). The processing unit 10, as used herein, means any type of computer or computational circuit, such as, but not limited to, a microprocessor unit, a microcontroller, a graphics processing unit, a digital signal processing unit, or any other type of processing circuit.

The method M provides automated verification of a software program in a behavior-driven development environment, e.g., an integrated development environment, which may comprise a BDD test automation framework like Cucumber, SpecFlow, Behave or similar having a library with BDD scripts and phrase pattern/test step definitions.

The method M comprises under M0 receiving, with the data processing system 10, test scenarios 1, e.g., by importing them from the BDD development environment. Each test scenario 1 defines an expected behavior of the software program in consecutive test steps 2. The test scenario 1 and thus the test steps 2 are formulated in a domain-specific language using natural language phrases and describe a desired outcome ("THEN") of the software program for predefined events ("WHEN") based on given initial conditions ("GIVEN"). The test scenarios 1 thus represent a specification and/or requirements of the software program in a chronological sequence.

As a simple example, a registering/login software may comprise the following (schematic) scenarios, wherein the keywords GIVEN, WHEN, THEN each define a respective test step 2:

```
Scenario 1: successful login
GIVEN a user has entered valid credentials
WHEN clicking on login
THEN start screen is shown
Scenario 2: wrong password
GIVEN a user has entered invalid credentials
WHEN pressing login
THEN an error message is shown
Scenario 3: unregistered user
GIVEN a not registered user has entered some credentials
WHEN press login
THEN an error message is shown
Scenario 4: Registration
GIVEN a not registered user
WHEN click on register
THEN the registration dialog is shown
```

The method M further comprises under M1 importing test step definitions 3 from the behavior-driven development environment. For the example above, such existing test step definitions 3 may look like this (formulated in an arbitrary programming language, e.g., Jave or C#):

```
@Given("^a user has entered [* credentials]$")
public void
enter_credentials(UCred arg1)
@When("^Click on Login button$")
@When("^Press Login$")
public void click_on_login( )
@When("^Click on Registration button$")
public void
click_on_registration( )
@Then("^Start screen is shown$")
public void
verify_start_screen_shown( )
@Then("^Error message is shown$")
public void
verify_error_msg_shown( )
@Then("^Registration screen is shown$")
public void
verify_registration_shown( )
```

Next, the method M comprises under M2 determining for each test step 2 of the test scenarios 1 if the test step 2 matches with one of the test step definitions 3 on basis of the natural language phrases of the test step 2. The method M further comprises under M3 assigning all matched test steps 2 to the corresponding test step definitions 3.

In the example from above, matched steps may comprise:

```
GIVEN a user has entered valid credentials
GIVEN a user has entered invalid credentials
@Given("^a user has entered [* credentials]$")
WHEN clicking on login
WHEN press login
@When("^Click on Login button$")
@When("^Press Login$")
```

However, a literal one-to-one matching may not be possible for all test steps 2. For example, "WHEN pressing login" is different form "WHEN press login" due to the different usage of the word "press". However, both test steps 2 are similar and thus natural language processing (NLP)

may be used to recognize these similarities. In a similar vein, "GIVEN a not registered user has entered some credentials" is similar to:

```
@Given("^a user has entered [* credentials]$")
and "WHEN click on Register" is similar to:
@When("^Click on Registration button$")
```

To identify these similarities, the method M further comprises under M4 applying NLP on the natural language phrases of any test steps 2 remaining unmatched. The NLP provides a confidence level for each unmatched test step 2 to correspond to one of the test step definitions 3. The method M further comprises under M5 assigning any unmatched test step 2 to the corresponding test step definition 3 when the confidence level surpasses a first predefined matching probability.

Figure 2:
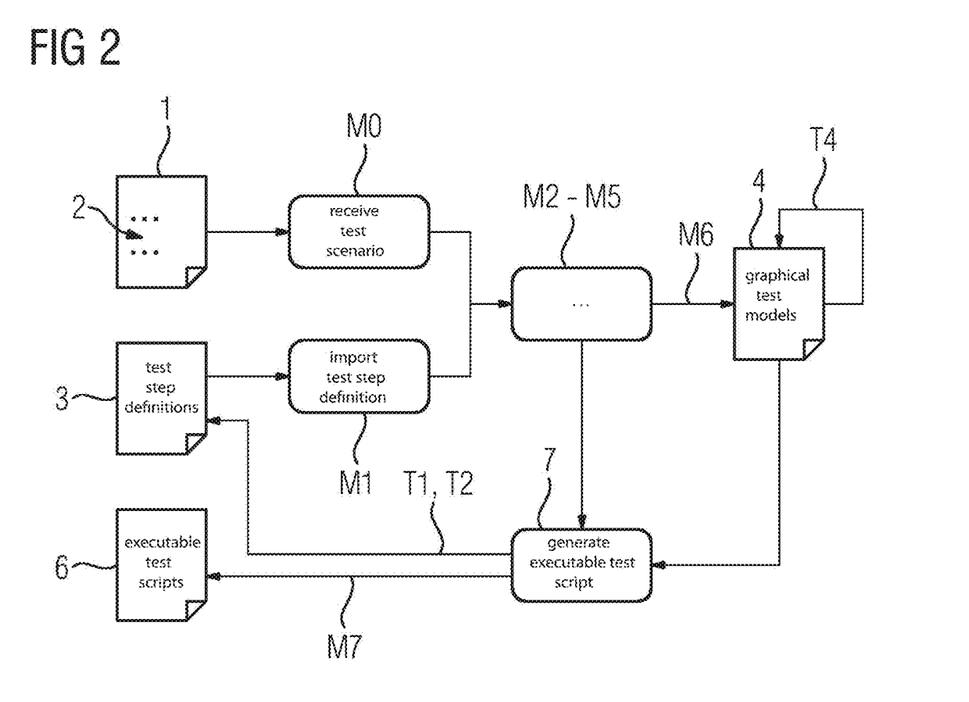
FIG. 2 shows a schematic flow diagram demonstrating aspects of the method of FIG. 1.
Figure 3:
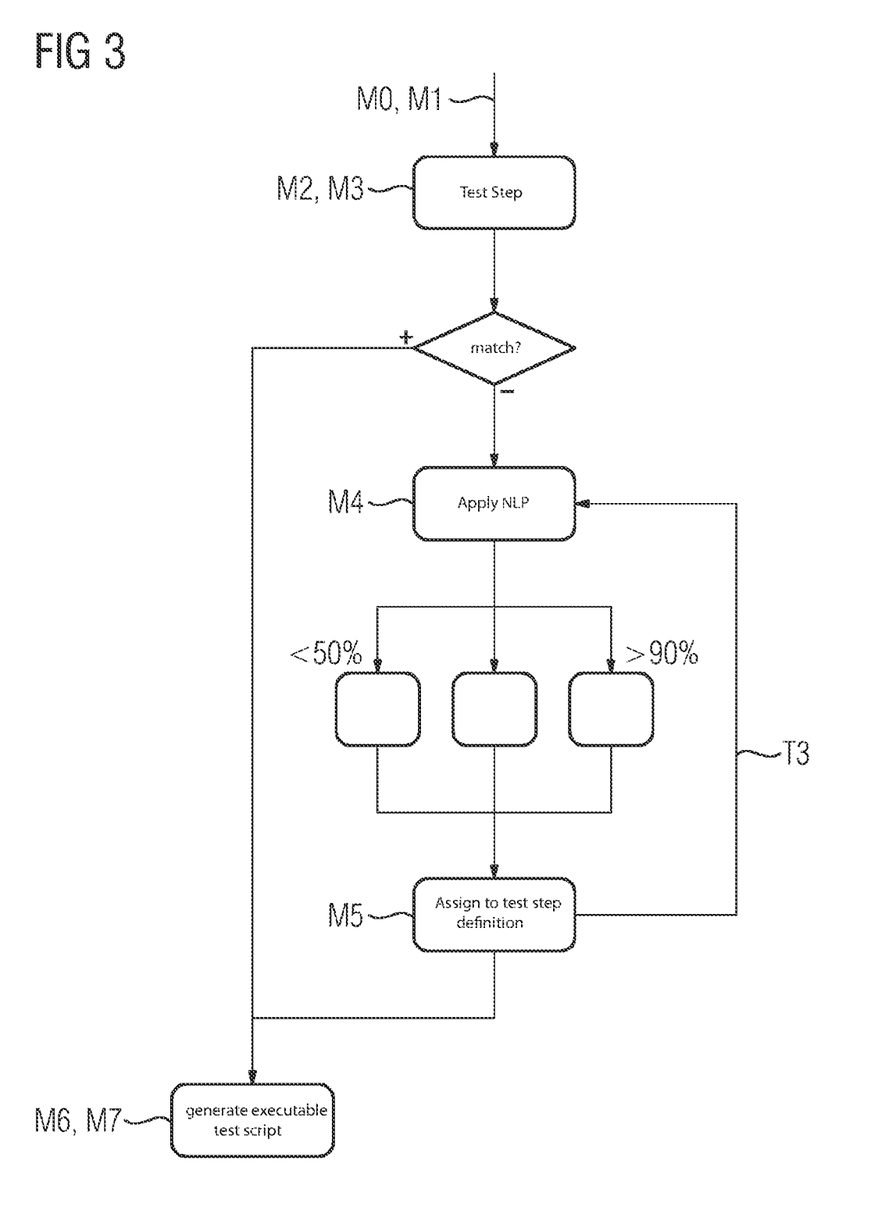
FIG. 3 shows a schematic flow diagram demonstrating aspects of the method of FIG. 1.

FIG. 3 shows an example, where the NLP is called under M4 as soon as one of the test steps 2 cannot be matched under step M2, M3. The NLP provides a confidence level, which is then compared with two predefined matching probabilities, a high probability of 90% and a low probability of 50%. If the confidence level is above 90%, then the corresponding test step 2 is assigned to the respective test step definition 3 under M5. The test step definitions 3 may be updated by including the assigned test step 2 in repository of test step definitions 3 within the BDD framework (cf. reference sign T1 in FIG. 2). In case that the confidence level is below 50%, a new test step definition 3 is added to the BDD test automation framework that corresponds to the not yet existing test step 2 (cf. reference sign T2 in FIG. 2).

If the confidence level is between 50% and 90%, a user verification is requested (cf. middle quadratic box in FIG. 1), which is then used under T3 as input for a machine learning algorithm of the NLP to improve the accuracy of the NLP in future runs. For example, the results of the assignments may be analyzed with respect to commonalities not identified, e.g., "Select" should be equal to "Click", or invalid commonalities, e.g., "Start screen" should be different from "Registration screen". Furthermore, the relevance of certain words or phrases may be reduced, e.g., in case of irrelevant words like "some". By optimizing the NLP engine, manual interventions for the NLP application may be reduced and/or completely avoided in the consecutive runs of the method M.

In the example from above, the assignment of test steps 2 and test step definitions 3 may look like this after running the NLP:

```
GIVEN a user has entered valid credentials
GIVEN a user has entered invalid credentials
GIVEN a not registered user has entered some credentials
@Given("^a user has entered [* credentials]$")
WHEN clicking on login
WHEN press login
WHEN pressing login
@When("^Click on Login button$")
@When("^Press Login$")
WHEN click on Register
@When("^Click on Registration button$")
THEN start screen is shown
@Then("^Start screen is shown$")
THEN an error message is shown
@Then("^Error message is shown$")
THEN the registration dialog is shown
@Then("^Registration screen is shown$")
Updated test step definitions 3 may comprise:
@When("^Click on Login button$")
```

```
@When("^Press Login$")
@When("^Pressing Login$")
public void_click_on_login( )
```

Figure 4:
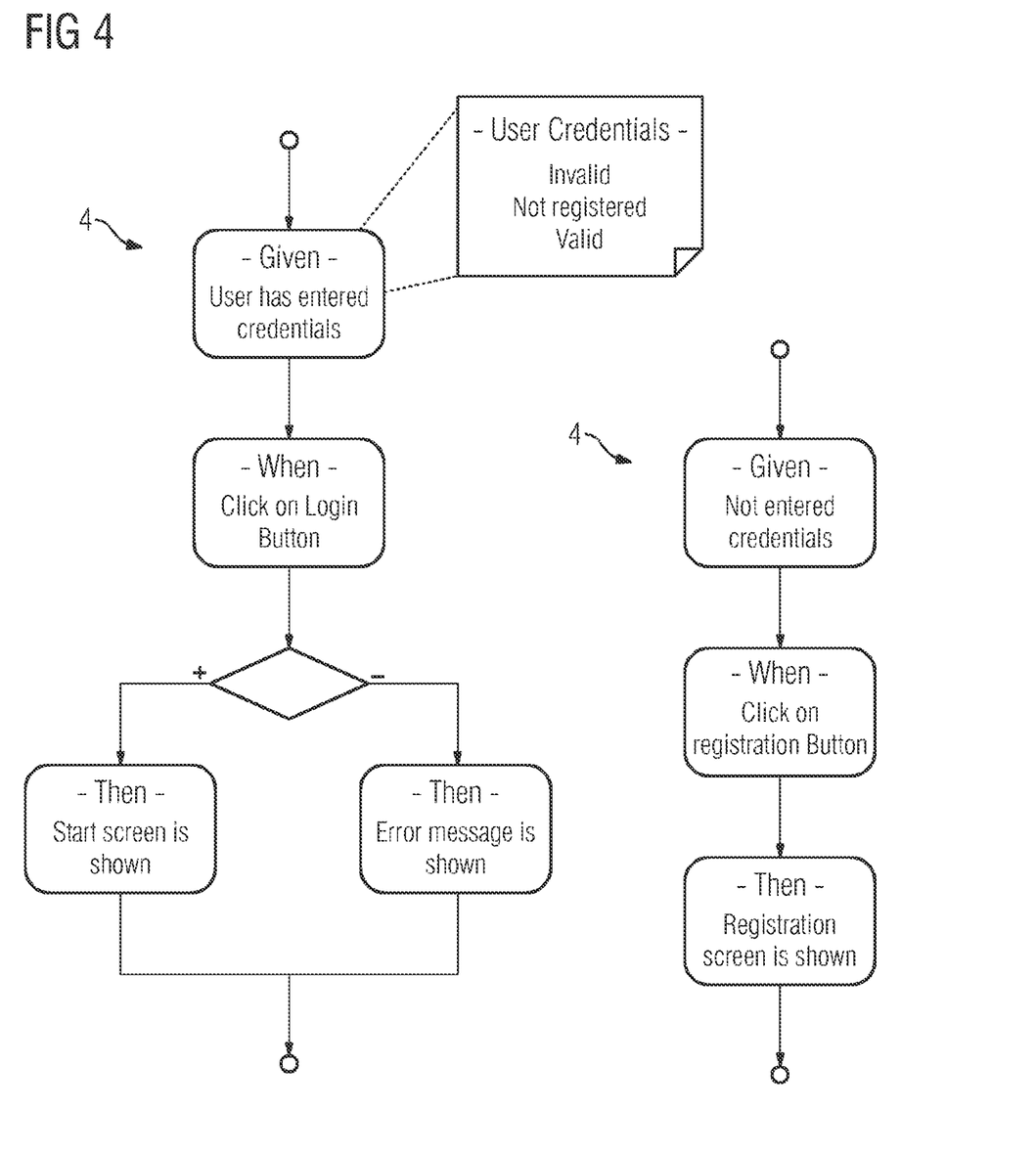
FIG. 4 shows an example for graphical test models derived with the method of FIG. 1.

Next the method M comprises under M6 generating graphical test models 4 for the test scenarios 1 on basis of the assigned test step definitions 3. The graphical test models 4 may be represented, for example, by Unified Modelling Language diagrams. Here, similar scenarios 1 may be combined on basis of the assignment of test steps 2 to test step definitions 3. An example is shown in FIG. 4, where two graphical test models 3 are generated from the above example, namely the case where a user has entered credentials and the case where a user has not entered credentials. The credentials may be invalid or valid or the user may not be registered at all. These different test data (user credentials: invalid, not registered, valid) may be identified by the NLP based on the natural language phrases and may be used to combine similar test scenarios 1, as it is shown in FIG. 4.

As indicated in FIG. 2, the method M may comprise under T4 comparing the graphical test models 4 with the test scenarios 1 to determine if the graphical test models 4 are in compliance with the expected behavior of the software program. For example, based on these graphical test models 4, missing scenarios 1 may be identified, e.g., a user with expired credentials or a registration attempt of an already registered user. Moreover, optimized test scenarios 1 may be generated, e.g.:

```
Scenario 1: successful login
GIVEN a user has entered [valid] credentials
WHEN click on login button
THEN start screen is shown
Scenario 2: wrong password
GIVEN a user has entered [invalid] credentials
WHEN click on login button
THEN an error message is shown
```

The method M further comprises under M7 generating executable test scripts 6 for the test scenarios 1 on basis of the assigned test step definitions 3. To this end, existing BDD tools and frameworks may be utilized, e.g., Cucumber or similar.

As a result, the method M described above provides the means to utilize the benefits of BDD (with easy to use, natural language based scenarios) while maintaining the required manageability for large, complex development projects. The generation and synchronization of a test model from BDD scenarios allows to utilize the advantages both from BDD and MBT methods, especially for large complex development projects. The model based review and generation of test cases ensures the consistency and completeness of the BDD scenarios. The ability to use MBT techniques to add an additional abstraction level bridges the gap between RE focused usage of BDD and a BDD based test automation approach. The automated step matching using machine learning allows an efficient mapping of BDD step phrases to a test automation framework and supports the structured development of the necessary framework code.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for automated verification of a software program in a behavior-driven development environment, the method comprising:
   receiving, with a data processing system, test scenarios, each test scenario defining an expected behavior of the software program in consecutive test steps, which are formulated in a domain-specific language using natural language phrases and which describe a desired outcome of the software program for predefined events based on given initial conditions;
   importing test step definitions from the behavior-driven development environment;
   determining for each test step of the test scenarios if the test step matches with one of the test step definitions on basis of the natural language phrases of the test step;
   assigning all matched test steps to the corresponding test step definitions;
   applying natural language processing (NLP) on the natural language phrases of any test steps remaining unmatched, wherein the NLP provides a confidence level for each unmatched test step to correspond to one of the test step definitions;
   assigning any unmatched test step to the corresponding test step definition when the confidence level surpasses a first predefined matching probability;
   generating graphical test models for the test scenarios on a basis of the assigned test step definitions; and
   updating a repository of test step definitions each time the confidence level is above the first predefined matching probability on a basis of the natural word phrases of the respective test step, and adding a test step definition to the repository of the behavior-driven development environment corresponding to the respective test step each time when the confidence level is below a second predefined matching probability, wherein, as a function of the updating and the adding, the respective test step of a future test scenario is matched directly with the corresponding test step definition stored in the repository without a use of the NLP.

2. The method according to claim 1, wherein a user verification is requested if the confidence level is below the first predefined matching probability but above a second predefined matching probability.

3. The method according to claim 2, further comprising: feeding the user verification to a machine learning algorithm of the NLP.

4. The method according to claim 1, wherein generating the graphical test models comprises combining similar test scenarios on basis of test steps assigned to the same test step definition.

5. The method according to claim 1, wherein generating the graphical test models comprises identifying test data within the test scenarios based on the natural language phrases.

6. The method according to claim 1, wherein the graphical test models comprise unified modeling language diagrams.

7. The method according to claim 1, further comprising: comparing the graphical test models with the test scenarios to determine if the graphical test models are in compliance with the expected behavior of the software program.

8. A data processing system comprising a processor configured to perform the method according to claim 1.

9. A computer program product, comprising a computer readable hardware storage device having computer readable program code stored therein, said program code executable by a processor of a computer system to implement the method according to claim 1.

10. A non-transient computer-readable data storage medium comprising executable program instructions configured to, when executed, perform the method according to claim 1.

11. A computer-implemented method for automated verification of a software program in a behavior-driven development environment, the method comprising:
    receiving, with a data processing system, test scenarios, each test scenario defining an expected behavior of the software program in consecutive test steps, which are formulated in a domain-specific language using natural language phrases and which describe a desired outcome of the software program for predefined events based on given initial conditions;
    importing test step definitions from the behavior-driven development environment;
    determining for each test step of the test scenarios if the test step matches with one of the test step definitions on basis of the natural language phrases of the test step;
    assigning all matched test steps to the corresponding test step definitions;
    applying natural language processing (NLP) on the natural language phrases of any test steps remaining unmatched, wherein the NLP provides a confidence level for each unmatched test step to correspond to one of the test step definitions;
    assigning any unmatched test step to the corresponding test step definition when the confidence level surpasses a first predefined matching probability;
    generating executable test scripts for the test scenarios on a basis of the assigned test step definitions; and
    updating a repository of test step definitions each time the confidence level is above the first predefined matching probability on a basis of the natural word phrases of the respective test step, and adding a test step definition to the repository of the behavior-driven development environment corresponding to the respective test step each time when the confidence level is below a second predefined matching probability, wherein, as a function of the updating and the adding, the respective test step of a future test scenario is matched directly with the corresponding test step definition stored in the repository without a use of the NLP.

12. The method according to claim 11, further comprising:
    updating, when the confidence level is above the first predefined matching probability, the respective test step definition on a basis of the natural word phrases of the respective test step.

13. The method according to claim 11, wherein a user verification is requested if the confidence level is below the first predefined matching probability but above a second predefined matching probability.

14. The method according to claim 13, further comprising: feeding the user verification to a machine learning algorithm of the NLP.

15. A data processing system comprising a processor configured to perform the method according to claim 11.

16. A computer program product, comprising a computer readable hardware storage device having computer readable program code stored therein, said program code executable by a processor of a computer system to implement the method according to claim 11.

17. A non-transient computer-readable data storage medium comprising executable program instructions configured to, when executed, perform the method according to claim 11.

\* \* \* \* \*